Figure 1:
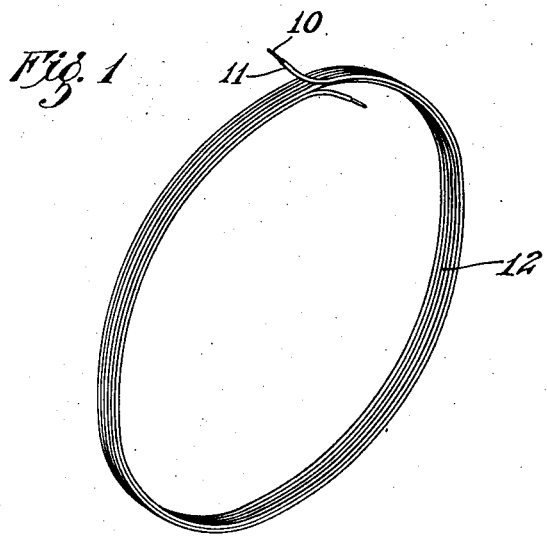

July 7, 1931.    C. W. LEGUILLON    1,813,176
TIRE BEAD CONSTRUCTION AND METHOD OF MAKING SAME Filed Feb. 28, 1927

Inventor
Charles W. Leguillon
By Pierson, Eakin & Avery
Attys

Patented July 7, 1931

1,813,176

UNITED STATES PATENT OFFICE

CHARLES W. LEGUILLON, OF AKRON, OHIO, ASSIGNOR TO THE B. F. GOODRICH COMPANY, OF NEW YORK, N. Y., A CORPORATION OF NEW YORK

TIRE BEAD CONSTRUCTION AND METHOD OF MAKING SAME

Application filed February 28, 1927. Serial No. 171,395.

This invention relates to a tire-bead construction, particularly to a bead of the inextensible type in which a wire core is embedded to impart to the bead its inextensible properties, and to a method of producing such tire-bead construction.

An object of this invention is to provide a wire construction for incorporation in a bead of the type employed in pneumatic tires which wire construction shall be strong and durable, resistant to abrasion and to corrosion and which shall also adhere firmly to the rubber of the bead in which it is incorporated. A further object is to provide a tire-bead construction in which the wire construction hereinabove referred to shall be incorporated and to which the rubber portions thereof shall be integrally and firmly bounded. A still further object is to provide a practical method for producing such a tire bead and for producing such a wire construction.

Heretofore it has been the practice to coat the steel wire which forms an inextensible unit of a bead construction with tin, generally upon the formation of the wire, and to utilize such tin-coated wire, in the form of a braid or a cable, as a core about which the rubber covering or exterior portion of the bead is formed. This construction has certain disadvantages, since tin is highly non-adherent with respect to rubber and it has heretofore been the practice to form the bead core of a plurality of wires so spaced, arranged or woven as to permit the rubber compound to enter into the interstices between the strands of wire and thus to become mechanically locked thereto. In such construction, the strength of the union between the wire core and the exterior rubber portion resides entirely in the mechanical interlocking of the rubber with the wire, the strength of which construction is dependent upon the strength of the webs or filaments entering into the iterstices of the wires forming the core, which webs or filaments frequently break down when subjected to the constant flexures to which the tire is subjected in service.

The present invention is based upon the discovery that certain rubber isomers which have a strong adhesive affinity to metals may be applied to steel wires of the type employed in making inextensible bead-cores, preferably shortly after the manufacture of the wire, and the wire stored for an indefinite period before building into a tire bead. This film-coating of the rubber isomer is impervious to air and moisture and completely protects the steel wire against corrosion during storage. Further, when the wire is built into a core bead, either in individual strands, twisted and woven cables, or woven braids, the coating which has up to this time effectively served as a protective coating for the steel wire, in addition has a strong adhesive affinity for rubber, so that when the bead constructed of such wire is covered with the exterior bead portion of rubber, the extended bonding surface between the wire and the rubber, co-extensive with the surface of the wire, imparts to the completed bead a truly integral construction which the constant and repeated flexures to which the bead is subjected in use is not able to break down.

In a preferred embodiment of carrying out this invention, the wire is formed at the mill in the usual manner, as by drawing, and is annealed or tempered to give the wire its proper characteristics of tensile strength, elasticity, etc., and is then, before its surface has had an opportunity to be attacked by the constituents of the atmosphere, coated with a film of a composition, the main constituent of which preferably has the following characteristics: an empirical formula of $(C_5H_8)_x$, a less chemical unsaturation than rubber, a specific gravity of from 0.97 to 1.00, a softening temperature of from 60° to 100° C., and a tough non-friable consistency at normal temperature, to which composition the term "heat plastic rubber isomer" is herein applied.

The rubber isomer is preferably applied to the steel wire in the form of a film, as by passing the wire through a bath composed of a solution of the rubber isomer in an organic solvent, such as benzene or gasoline, or the coating may be applied by passing the wire through a spray of the rubber isomer solution issuing from the usual and well known spray guns. The coated wire is then dried in any suitable manner, as by passing through an oven where the solvent is evaporated and recovered, and the wire is then reeled for storage and shipment.

It will be understood that the wire may be directly and immediately employed in the building of a wire tire bead, but since such operations are usually carried out in independent manufacturing etablishments usually at considerable distances apart, the wire is not employed for the manufacture of the bead cores for a considerable time after it has been produced at the wire mill. During this intervening time the steel wire is completely protected from the elements by the film coating of the rubber isomer which is resistant and impervious to water, salts, weak acids and alkalies, and hence may be stored without regard to the impurities or fumes which may be present in the atmosphere of the storehouse or factory.

The wire treated as hereinabove described may be made into an inextensible bead core by any of the methods commonly employed, but a distinctive advantage of the present invention resides in the fact that the bead core need not be constructed to provide a multiplicity of interstitial spaces between the wires to serve as mechanical locks for the outer rubber portion of the bead, but that the wires may if desired be employed as individual strands without weaving, braiding or twisting the individual strands as is now the common practice. This simplification of structure of a bead is made possible by reason of the fact that the union of the outer rubber portion of the inextensible bead core is effected by the film adhesion of the rubber to the rubber isomer coating of the wire and is not dependent upon mechanical interlocking of the rubber with the wire bead. When the coated wire has been formed into the bead core, the exterior rubber portion is applied by any of the well known processes, as by tubing and the bead subsequently built into a tire carcass in any suitable manner.

Figure 2:
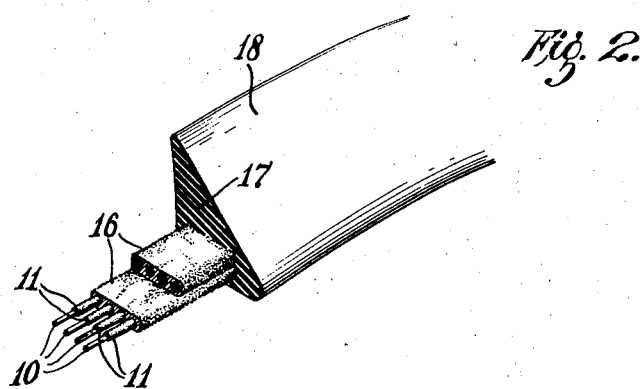
Figure 3:
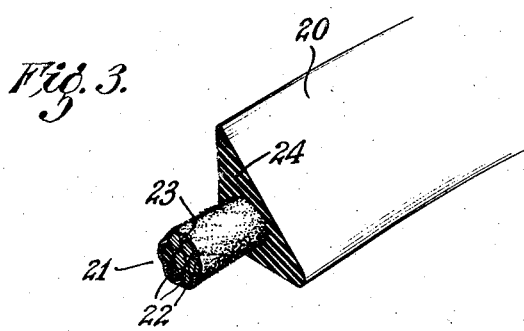

In the accompanying drawings, Fig. 1 represents a bead core constructed of a single wire of a plurality of convolutions; Fig. 2 shows a tire bead having a parallel-stranded wire bead core, and Fig. 3 illustrates a tire bead containing a twisted cable bead core.

The bead core of Fig. 1 is made up of a single wire 10 coated with a thin film of a heat plastic rubber isomer 11 and wound, as on a drum, to form an annulus 12 constituting an inextensible core for a bead. As has been hereinabove pointed out, the usual cross or weft wires are not required in this bead core, although obviously they may be used, since the bond to the surrounding rubber composition of the bead is made amply secure by reason of the firm union of the film coating to the rubber. The rubber composition is built about the core to form a bead and the bead is built into a tire casing and the assembled structure valcanized in any suitable manner. The heat of the vulcanization process, serves to bond the tire casing to the rubber composition of the bead body and the bead body to the wire of the bead cores, through the intermediary of the rubber isomer coating, to effect a firm union of these component parts of the finished tire casing.

In Fig. 2, a bead having a parallel stranded core, either of the single wire construction of Fig. 1, or composed of a plurality of wires wound together in parallel relation, is illustrated. The wires 10 are coated with the rubber isomer 11 and are formed into an annular bead core either prior to or simultaneously with the application of a suitable cover composition 16, preferably a rubber composition, to which construction the usual bead body 17 is applied. The bead 18 thus constructed may be built into a tire carcass by any of the usual and well known methods.

In either of the constructions of Figs. 1 or 2, the amount of wire employed is preferably materially less than that normally employed in bead cores designed for comparable service and is preferably such only as is necessary to impart to the bead core the requisite strength and inextensible properties. A saving in material as well as in the weight of the finished tire casing is thus effected without in any way detracting from the serviceability and durability of the product.

A modified construction is shown in Fig. 3. This comprises a bead 20 having a wire core 21 in the form of a twisted grommet of wires 22. In constructing the bead, the twisted grommet is first formed and is then coated with the rubber isomer, shown at 23, and the coated grommet built into the body portion 24 of the bead. The bead thus constructed, either after a partial vulcanization or without vulcanizing, is ready to be built into the tire casing.

Where wire is employed in the construction of bead cores which has not been coated with the rubber isomer at the time the wire is made, the surface of the wire should be cleaned free of corrosion products or of any protective coating, where lacquers and the like have been used for this purpose, and the surface of the cleansed wire then coated with the rubber isomer. The coated wire is then ready to be built into the tire casing in the manner hereinabove indicated. It will be obvious that this process just described is more expensive than the treatment of the wire at the time of its manufacture, but the bead constructed of such subsequently cleansed wire possesses all the advantages of the construction hereinabove more fully set forth.

The rubber isomers referred to in the constructions of this application have hereinabove been described by defining the salient chemical and physical properties thereof. I find that the rubber isomers suitable for the process and construction of the present application may be prepared by a number of different methods (which methods, however, form no part of the present invention) of which the following are illustrative: The tacky heat plastic products formed under the influence of heat by the reaction of (a) rubber and a sulfonic compound having the generic formula R—SO$_2$—X, in which R represents hydrogen or a hydroxy group and X represents a hydroxy group of chlorine; or (b) rubber and other isomerizing agents or substances which when heated with rubber liberate or otherwise make effective in the reaction mixture isomerizing agents of rubber, such as hydrochloric acid, hydrobromic acid, sulfuric acid and trichloracetic acid. In brief, the term "heat plastic rubber isomer" as herein used is intended to include any composition having as a main constituent a heat plastic rubber isomer of the type herein described, whether made by any of the above indicated methods or by other methods, and whether admixed with other materials or not.

The advantages of the constructions of this application are readily apparent. A more durable bead is produced, one in which the rubber outer portion will not separate from the central wire bead core during continued service. Less wire need be employed in a bead construction of the present application, and the bead may be of weftless parallel-strand construction or, if desired, the entire bead core may be made of a single convoluted strand. This is due to the fact that the union between the bead core and the outer rubber cover, heretofore dependent upon the number of interstices between the strands of wire composing the bead and making necessary a bead core with a large cross-sectional area to provide an adequate mechanical anchorage for the rubber to the bead, according to the present invention, is effected by the strong adhesive bond made possible by the rubber isomer coating. Since no provisions are necessary for the mechanical interlocking a weftless parallel stranded bead may be employed and only sufficient wire need be employed to give the bead the desired inextensible properties. Experiment has indicated that a bead containing about half the amount of wire now commonly employed in woven or braided bead constructions will possess adequate inextensible properties and provide more than ample bonding strength between the core and the outer rubber portion.

Further advantages reside in the facility and economy with which the steel bead-wire may be coated, the absolute protection against corrosion afforded by the rubber-isomer coating, and the resistance of the coating to injury by abrasion or impact during the bead manufacturing operations.

While I have described herein a preferred embodiment of my invention, it is to be understood that numerous variations and modifications thereof may be made without departing from the principles of the invention herein set forth and I therefore do not purpose to limit the present invention to any particular method of wire manufacture, or to any particular construction of an inextensible bead core, or to any particular construction of a bead containing such a core, except as may be defined in the claim hereto appended.

I claim:

The method of making an inextensible tire bead which comprises coating the surface of a steel wire, while in a relatively clean condition, with a film of a tacky heat plastic rubber isomer, forming the wire into a multi-strand bead core, surrounding said core with a vulcanizable rubber composition, and thereafter subjecting the bead to a vulcanizing temperature, whereby the outer rubber portion of the bead is bonded to the wire core through the intermediary of the rubber isomer coating with a durable and permanent bond.

In witness whereof I have hereunto set my hand this 3rd day of February, 1927.

CHARLES W. LEGUILLON.

CERTIFICATE OF CORRECTION.

Patent No. 1,813,176.  Granted July 7, 1931, to

CHARLES W. LEGUILLON.

It is hereby certified that error appears in the printed specification of the above numbered patent requiring correction as follows: Page 1, line 18, for "bounded" read bonded, and line 90, for "temperature" read temperatures; page 3, line 14, for "of" read or; and that the said Letters Patent should be read with these corrections therein that the same may conform to the record of the case in the Patent Office.

Signed and sealed this 8th day of December, A. D. 1931.

(Seal)

M. J. Moore,
Acting Commissioner of Patents.